April 21, 1970    JAMES E. WEBB    3,507,114
ADMINISTRATOR OF THE NATIONAL AERONAUTICS
AND SPACE ADMINISTRATION
SOLID PROPELLANT LINER
Filed Nov. 27, 1967
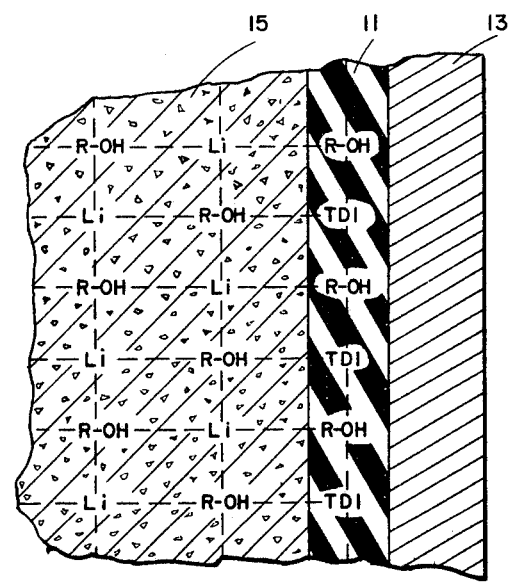
INVENTOR.
MARVIN W. STARK
BY

United States Patent Office 3,507,114
Patented Apr. 21, 1970

3,507,114
SOLID PROPELLANT LINER
James E. Webb, Administrator of the National Aeronautics and Space Administration, with respect to an invention of Marvin W. Stark, Tripoli, Libya
Filed Nov. 27, 1967, Ser. No. 685,750
Int. Cl. F02c 3/26
U.S. Cl. 60—39.47       9 Claims

ABSTRACT OF THE DISCLOSURE

A liner for use with solid propellant formulations having hydroxy-terminated polybutadiene containing lithium particles, which liner will bind the propellant material to an outer motor casing. The liner is comprised of hydroxy-terminated polybutadiene and toluene diisocyanate. The liner composition can additionally contain a suitable catalyst and a strengthening agent such as carbon black, if needed.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435. 42 U.S.C. 2457).

BACKGROUND OF THE INVENTION

Field of the invention

This invention relates to solid propellant technology, and more particularly to a new liner for use with a class of hybrid solid propellants to suitably bind the propellants to rocket motor cases.

Description of the prior art

This invention is particularly useful for hybrid solid propellant formulations containing lithium. An example of the type of hybrid propellants to which this invention is particularly directed as described in U.S. Patents 3,304,213 of Feb. 14, 1967, and 3,341,509 of Sept. 12, 1967. In those patents there is described a high regression energetic hybrid solid propellant comprised of lithium and polybutadiene, additionally containing, if desired, lithium hydride. It is well known in solid propellant technology that it is necessary to generally provide an adhesive surface between the solid propellant grain and the outer case which contains it. This layer of material is normally referred to as a liner since it often insulates as well as bonds. The overall performance and reproducibility of the desired characteristics of a solid propellant grain are highly dependent upon the adequacy of the liner in achieving a bonding of the grain to the case.

Hybrid solid propellant formulations provide particularly difficult problems with regard to bonding them to the motor case. The reactive components, such as lithium, often reacted with conventional liners heretofore used in the art, giving off gases which served to deleteriously affect the propellant. Liners that have been attempted to be utilized with hybrid fuel grains generally displayed poor adhesion resulting in debonding or separating of the propellant from the case during combustion. This normally leads to an aborted firing. Also, previous liners, whether used for hybrid grains or otherwise, were dependent upon physical adhesion in order to achieve a bond between the fuel grain and the motor case. In other words, the propellant was physically bonded to the liner which in turn was bonded to the case. The liner was chosen as a material which, serving in its intermediate capacity, would bond well both to the case and the propellant. Various attempts were made to improve this basic system. One example of such a technique was to coat the outer surface of the propellant grain with a surface preparation material which would serve as a chemical between the liner and the propellant. However, this introduced a further step in the processiny of the grains and was thus time consuming and costly.

SUMMARY OF THE INVENTION

This invention relates to a novel liner composition which is particularly useful with hybrid solid propellants containing lithium. As will be explained, the novel liner, unlike those of the prior art, forms a chemical cross-linking with the fuel. This results in exceptional bonding strength as well as compatibility with the propellant. The liner is comprised of a matrix of hydroxy-terminated polybutadiene with a suitable amount of toluene diisocyanate as a cross-linking agent. The amount of toluene diisocyanate, TDI, utilized is determined by the hydroxy equivalent of the polybutadiene, that is, enough toluene diisocyanate is required to react with the hydroxyl groups present in the polybutadiene for a cross-linking effect on about a 1:1 ratio of the amount of TDI per hydroxyl group. Additionally, if a faster cure is desired, a catalyst can be added in a suitable amount. An example of such a catalyst is dibutyltin dilaurate. Further, a conventional hardening or strengthening agent such as carbon black can be present if desired. The liner is utilized with, as indicated, solid propellant compositions containing lithium and/or lithium hydride such as disclosed in the aforementioned patent. The matrix for the hybrid fuel is the same matrix used for the liner, namely, hydroxy-terminated polybutadiene. As will be shown and explained, it is believed that the exceptional bonding occurs because of migration of the lithium in the propellant into the liner so as to aid in the cross-linking thereof, while some of the TDI in the liner migrates to cross-link with the polybutadiene matrix of the propellant. It is pointed out that the liner composition, per se, is well known since TDI is a known cross-linking agent for hydroxy-terminated polybutadiene. The particular novelty of this invention is directed to the new and unobvious use of the composition in combination with the lithium containing fuels to achieve results heretofore unobtainable.

Thus, it is an object of this invention to provide a new liner suitable for bonding lithium containing hybrid propellants.

Another object of the invention is to provide a new liner for lithium containing hybrid propellants which form a strong chemical bond therewith.

A further object of this invention is to provide a new use for a polybutadiene polymer system.

Other objects will become apparent from the following detailed description and drawing in which:

The figure represents a schematic representation of the cross-linking between the liner material and the solid propellant of this invention.

The hybrid fuel for which the liner is particularly adapted is described in detail in the aforementioned patents No. 3,304,213 and No. 3,341,509. Though the patents referred basically to the use of polybutadiene, mention was specifically made of a hydroxy-terminated version which was particularly suitable as a binder material. It is this type of polybutadiene with which the herein liner is suitably adapted. The polybutadiene has a molecular weight of up to 3000 and a room temperature viscosity of about 300 poises. The broad range of propellant composition set forth in Patent No. 3,304,213 is from a ratio of 1 part of lithium to from about .25 to 4 parts polybutadiene, with up to 50 percent lithium hydride as a substitute for the lithium and polybutadiene. As indicated, the lithium hydride acts as a diluent in the system and can be added up to a point where the composition is no longer self-sustaining and is then utilizable as a restart motor. It should be apparent, as indicated in the patents, that various other conventional ingredients utilizable in hybrid fuels can be added as long as they do not significantly affect the overall performance of the motor.

One outcome of the effort directed to the prior propellant work was the discovery that lithium serves to aid in the cross-linking of hydroxy-terminated polybutadiene. This discovery has an important impact upon the effectiveness of the herein liner composition, as will be further explained.

As indicated, in a liner composition comprised of hydroxy-terminated polybutadiene, toluene diisocyanate serves as a cross-linking agent for the polybutadiene and should be present in a range of .8 to 1.2 isocyanate groups per —OH groups present in the poybutadiene. The normally used hydroxy-terminated polybutadiene has slightly over two —OH groups per molecule of polybutadiene. The functionality, or number of —OH groups present, can be controlled in the making of the material and is well known in the art. Normally the liner incorporates a corbonaceous material, such as lamp black or carbon black or the like, to give added strength and rigidity to the liner composition. The carbon black can be present from 0 to 10 weight percent of the composition, depending upon the physical properties desired. Further, if a faster cure is sought, a small amount of a suitable catalyst, such as dibutyltin dilaureate, can be added in up to .10 weight percent. However, it should be pointed out that the liner composition will suitably cure without such a catalyst.

The ingredients of the novel liner of this invention are mixed under vacuum conditions until they are thoroughly combined. The liner then can be coated in the desired layer inside the motor case and then cured for at least two hours at 150° F. When no catalyst is used, the cure time generally increases slightly to two and one-half hours. The solid propellant is then cast into the resulting case and liner and cured therein. Alternatively, the liner of the invention can be coated upon a previously cured propellant grain, then inserted into a motor case and cured at the foregoing temperature. In hybrid propellants, the need for insulation is not great, thus the liner is usually of very thin coating serving mainly as only an adhesive. A typical thickness of this coating is 0.005 mil.

The reason for the superior strength and compatibility of the liner of this invention with the hybrid fuel is shown in the accompanying figure. It is believed that the superior properties are achieved through an actual chemical linking between the propellant system and the liner. As shown in the figure, the liner 11 is disposed between the motor casing 13 and the solid propellant grain 15. The R—OH in the liner and the propellant grain represent the terminus of the hydroxy-terminated polybutadiene matrix material used. As can be seen, in the fuel 15 lithium serves as a cross-linking agent between the polybutadiene groups to form a cross-linked network. Alternatively, in the liner 11, the toluene diisocyanate, TDI, is a cross-linking agent. What is believed to occur, as demonstrated in the figure, is that the TDI in the liner in addition to linking with the hydroxy-terminated polybutadiene therein, additionally migrates to link with the same material in the propellant 15. Alternatively, essentially the same effect occurs with the lithium in the propellant 15 which migrates to link with the polybutadiene in the liner 11. The result is believed to be a network similar to that shown in the drawing.

The liner to fuel bond in test performances exceeds the strength of either the liner or the fuel itself. The maximum tensile stress between the liner and a steel motor case was determined to be 123 p.s.i. As indicated, in all instances, tensile failure of the liner or the fuel resulted rather than any bond failure at the interface between the liner and fuel. Following is a specific example of a liner made in accord with this invention:

EXAMPLE

A liner was formed by mixing together a composition comprised of 90.48 weight percent hydroxy-terminated polybutadiene to which was added 2.5 weight percent of carbon black powder. The carbon black powder was added slowly and mixed under vacuum conditions for 15 minutes. 6.93 weight percent of 2,4-toluene diisocyanate was then added to the mixture and the resultant composition was vacuum mixed for an additional five minutes. Finally, .09 weight percent of dibutyltin dilaureate was added, and the composition mixed for three minutes. The mixture was then coated in about a 0.005 inch thickness into a fiber glass wound motor case having an inside diameter of 18 inches. The liner was then cured in the case for two hours at 150° F. Into the case was then poured a hybrid propellant composition comprised of 50 weight percent hydroxy-terminated polybutadiene and 50 weight percent lithium in the form of spheres. The resultant motor was then cured for 72 hours at 140° F. The resultant motor was successfully test fired with no indicated delamination between the liner and the case or liner and propellant.

When the same example is repeated omitting the utilization of the catalyst, equally successful results are obtained. As indicated, the curing time is generally increased to two and one-half hours at 150° F. Further, when the example is repeated using a propellant in which 50 weight percent of the lithium has been replaced by lithium hydride, equally successful results are obtainable.

Additionally, it is pointed out that though the novel composition of this invention is referred to as a liner, it should be apparent to those skilled in the art that this material can be used as a potting compound or aft grain or forward grain insulation as well as an adhesive in hybrid solid propellant rocket motors containing lithium as a propellant constituent.

What is claimed is:
1. A method of bonding hybrid solid propellants containing lithium and hydroxy-terminated polybutadiene comprising:
   applying between said propellant and an article to which it is to be bonded a liner comprising hydroxy-terminated polybutadiene and toluene diisocyanate, and curing said liner.
2. The method of claim 1 wherein said propellant is to be bonded to a rocket motor case comprising:
   coating the inside of said case with said liner prior to casting said propellant therein.
3. The method of claim 1 wherein said propellant is to be bonded to a rocket motor case comprising:
   coating the outer surface of a formed propellant grain with said liner,
   and inserting said propellant and liner into said motor case prior to curing said liner.
4. The method of claim 1 wherein said liner additionally comprises a carbon strengthening compound.
5. The method of claim 1 wherein the toluene diisocyanate is present in an amount sufficient to provide .8 to 1.2 isocyanate groups per hydroxyl group on said polybutadiene in said liner.
6. In combination:
   a rocket motor casing,
   a solid propellant disposed in said casing, said propellant comprising hydroxyterminated polybutadiene having lithium therein,
   a liner disposed between said propellant and said casing, said liner comprising hydroxy-terminated polybutadiene and toluene diisocyanate in an amount sufficient to cross-link said polybutadiene.

7. The combination of claim 6 wherein said liner can additionally comprise up to 10 weight percent carbon black and up to .10 weight percent catalyst.

8. The combination of claim 6 wherein said propellant comprises lithium and polybutadiene in the ratio by weight of one part lithium and from about 0.25 to 4 parts hydroxyterminated polybutadiene with up to 50 percent lithium hydride as a substitute for said lithium and polybutadiene.

9. A liner for bonding solid propellant compositions comprising:
- 90.48 weight percent hydroxy-terminated polybutadiene,
- 2.50 weight percent carbon black,
- 6.93 weight percent 2,4-toluene diisocyanate,
- and 0.09 weight percent dibutyltin dilaurate.

References Cited

UNITED STATES PATENTS

| | | | |
|---|---|---|---|
| 3,399,088 | 8/1968 | Christian et al. | 149—19 |
| 2,563,265 | 8/1951 | Parsons | 102—103 |
| 3,032,970 | 5/1962 | Fox | 102—103 |
| 3,055,952 | 9/1962 | Goldberg | 260—77.5 |
| 3,084,141 | 4/1963 | Kraus et al. | 260—77.5 |
| 3,084,177 | 4/1963 | Hostettler et al. | 260—2.5 |
| 3,304,213 | 2/1967 | Stang | 149—19 |
| 3,305,523 | 2/1967 | Burnside | 149—19 |
| 3,341,509 | 9/1967 | Stang | 260—94.7 |

ROBERT F. STAHL, Primary Examiner

U.S. Cl. X.R.

102—103; 149—19; 260—77.5, 2.5; 264—3